United States Patent [19]

Kao

[11] 3,743,975

[45] July 3, 1973

[54] ADJUSTABLE EQUALIZER CONTROL APPARATUS

[75] Inventor: Chih-yu Kao, Lawrence, Mass.

[73] Assignee: Bell Telephone Laboratories, Incorporated, Murray Hill, N.J.

[22] Filed: Feb. 22, 1972

[21] Appl. No.: 228,079

[52] U.S. Cl. .................................... 333/18, 325/65

[51] Int. Cl. ............................................ H04b 3/04

[58] Field of Search ............................ 333/18, 70 T; 325/42, 65

[56] References Cited

UNITED STATES PATENTS 3,573,667 4/1971 Kao et al. ............................ 333/18

3,633,129 1/1972 Kao et al. ............................ 333/18

*Primary Examiner*—Paul L. Gensler

*Attorney*—W. L. Keefauver

[57] ABSTRACT

Apparatus for controlling an equalizer having a plurality of independently adjustable, serially connected equalizer sections. The apparatus controls the equalizer to minimize the square of transmission system misalignment integrated over all frequencies in the operating band of the system. The effect of each section of the equalizer at all frequencies in the operating band is considered in determining required adjustments for all sections.

8 Claims, 2 Drawing Figures

ADJUSTABLE EQUALIZER CONTROL APPARATUS

BACKGROUND OF THE INVENTION

1. Field of the Invention

This invention relates to analog signal transmission systems and more particularly to automatic equalization in wideband, analog communications systems.

2. Description of the Prior Art

In long distance analog signal transmission systems, elaborate precautions must be taken to prevent unude attenuation of the transmitted signal. Where the signal frequencies present in the signal transmitted are distributed over a relatively wide band, the problem is complicated by the fact that attenuation typically varies with frequency.

Among the devices most commonly used to compensate for attenuation in wideband analog transmission systems is the so-called adjustable bump equalizer. Equalizers of this type are discussed, for example, in "The L3 Coaxial System: Equalization and Regulation" by R. W. Ketchledge et al. (*Bell System Technical Journal*, Vol. 32, No. 4, July 1953, pp. 833–878, particularly pp. 842–851) and in "The L4 Coaxial System: Equalizing and Main Station Repeaters" by F. C. Kelcourse et al. (*Bell System Technical Journal*, Vol. 48, No. 4, April 1969, pp. 889–952, particularly pp. 896–913). In general, a bump equalizer includes a plurality of independently adjustable, serially connected equalizer networks or sections. Ideally, the frequency response of each of these sections is flat and constant over the operating band of the system with the exception of a predetermined, relatively narrow frequency range (called the effective frequency range) in which the amplitude of that response is adjustable. This adjustment is effected by a single control quantity or signal. By selecting equalizer sections with effective frequency ranges distributed over the entire transmission band of the system, any misalignment of the transmission line served by the equalizer in any portion of the transmission band can be corrected by appropriately adjusting the one or more equalizer sections which influence equalization in that portion of the transmission band.

Several types of apparatus for measuring misalignment and generating signals for controlling the several sections of a bump equalizer are known. The equalizer control apparatus discussed in the above-mentioned article by Kelcourse et al., for example, operates on the assumption that for purposes of adjustment the effective ranges of the equalizer sections are mutually exclusive and that the required adjustment of any section can be determined from the level of a single pilot signal having a frequency within the effective range of that section.

In extremely broadband communication systems and in systems operating at very high frequencies, it is necessary to realize more nearly perfect equalization than is possible given the assumptions usually made about bump equalizers. In particular, since the effective ranges of practical equalizer sections are not sharply defined, these ranges must overlap to some extent in order to span the entire transmission band. This, coupled with the fact that the frequency response of the sections is neither perfectly flat nor constant outside the effective range of that section, renders the assumption of mutual exclusivity between effective ranges a particularly weak one. In addition, there are several boradband attenuation phenomena which are more easily dealt with on a broadband basis, e.g., with equalizer sections having frequency response functions adjustable over the entire transmission band of the system. There is, of course, no mutual exclusivity between such broadband effective frequency ranges. Moreover, equalizer sections having relatively broad effective frequency ranges are not as amenable to control by pilot signals as sections with narrow bump-shaped responses. Broad and narrow effective frequency ranges are therefore relatively incompatible for purposes of control in prior art systems. Pilot signals also have the disadvantage that equalization for a frequency band, even though relatively narrow, is based on how the system transmits the single pilot frequency.

It is therefore an object of this invention to improve automatic equalization in analog transmission systems.

It is another object of this invention to perform automatic equalization in analog transmission systems without the use of pilot signals.

It is another object of this invention to provide apparatus for controlling the several sections of an adjustable bump equalizer which does not assume mutual exclusivity between the effective frequency ranges of the several sections.

It is still another object of this invention to provide adjustable equalizer control apparatus suitable for controlling equalizer sections having either broad or narrow effective frequency ranges.

SUMMARY OF THE INVENTION

These and other objects of the invention are accomplished, in accordance with the principles of the invention, by adjustable equalizer control apparatus which readjusts the equalizer on the basis of transmission system misalignment at all frequencies in the transmission band. More particularly, control apparatus is provided for determining and readjusting an equalizer to minimize the square of the transmission system misalignment integrated over all frequencies in the transmission band. The effect of each section of the equalizer at all frequencies in the transmission band is also considered in determining the extent to which all sections must be readjusted to minimize the integral-square misalignment. The control system therefore places no reliance on mutual exclusivity between the effective ranges of the frequency response functions of the equalizer sections and is equally suitable for control of sections with broad or narrow effective frequency ranges.

In my concurrently filed application Ser. No. 227,739, I disclose apparatus for controlling an adjustable equalizer on the basis of a misalignment signal integrated over each of several frequency ranges in the operating band of the system. In accordance with the principles of the instant invention, the integrations taking place are integrations over the entire operating band of the system rather than over subsegments of the operating band. In addition, it will be evident that the signal integrated in this case is different from the signal integrated in my concurrently filed application and that the matrix used to characterize the several sections of the equalizer is also different in the apparatus of the two inventions. These differences stem from considerably different analyses of the adjustable equalizer control problem and are reflected in considerably different equalizer control apparatus.

Further features and objects of this invention, its nature, and various advantages, will be more apparent upon consideration of the attached drawing and the following detailed description.

DETAILED DESCRIPTION OF THE INVENTION

Figure 1:
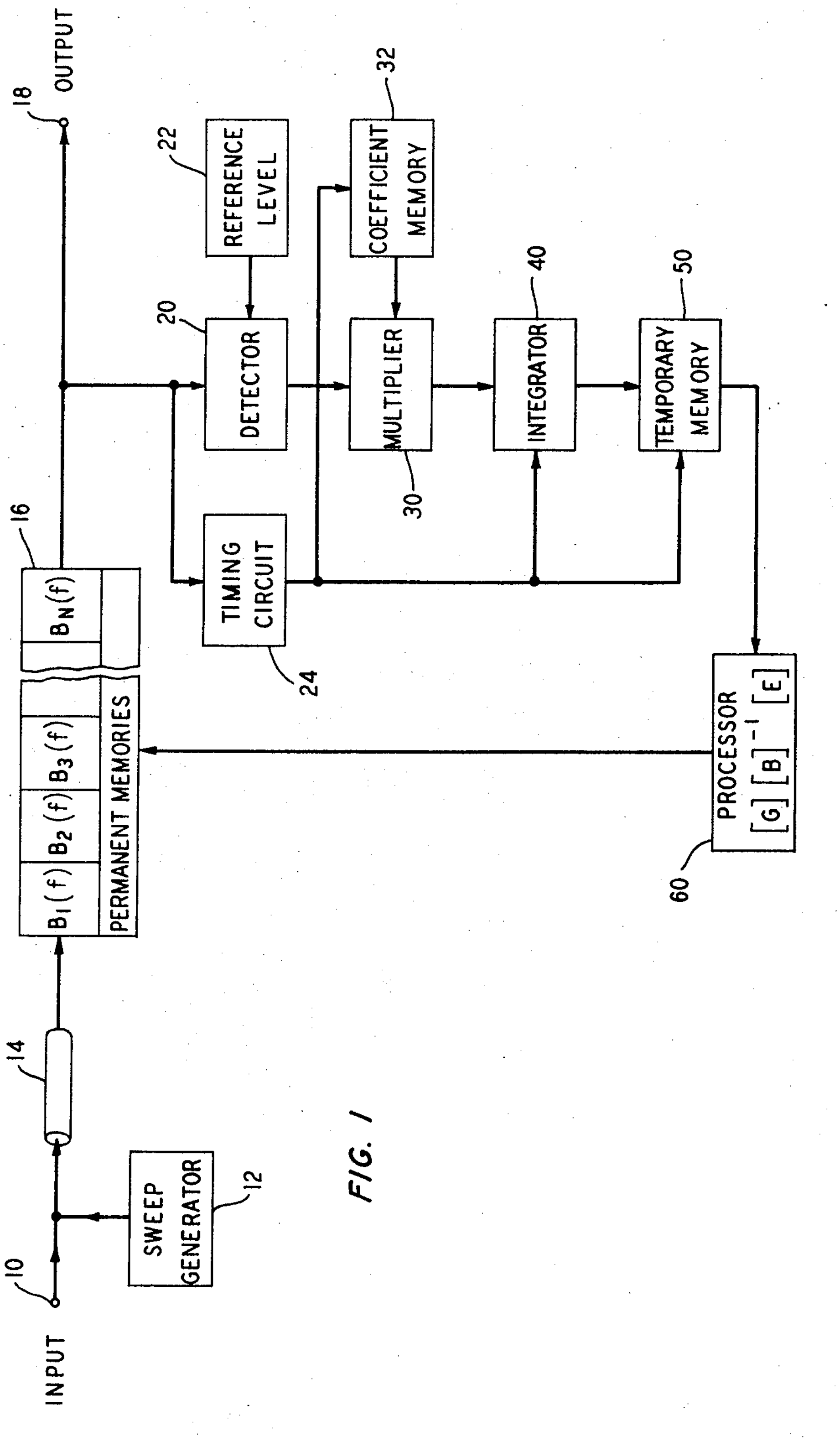
FIG. 1 is a block diagram of one embodiment of the adjustable equalizer control apparatus of this invention.

When in service, the transmission system of FIG. 1 transmits signal information from input terminal 10 to output terminal 18 by way of cable 14 and equalizer 16. Cable 14, of course, represents any long-distance transmission medium and may include any number of intermediate repeaters and equalizers. Equalizer 16 is basically a bump equalizer of any well known type including N serially connected equalizer sections having normalized frequency response functions $B_1(f)$ through $B_N(f)$, respectively. Each of these functions expresses the effectiveness of the corresponding equalizer section, i.e., the sensitivity of the actual frequency response of the corresponding equalizer section to change in the quantity controlling that section.

Although basically a bump equalizer, equalizer 16 may include one or more equalizer sections having frequency response functions adjustable over a relatively broad frequency range rather than the relatively narrow effective ranges typical of bump equalizers. Thus one section of equalizer 16 may be designed to have an adjustable flat frequency response across the entire transmission band while another may have an adjustable frequency response which is a function of the square root of frequency for all frequencies in the transmission band. Equalizer sections of this type can be controlled in accordance with the principles of this invention in precisely the same way as equalizer sections having bump-shaped frequency response functions.

In any event, the actual amplitude of the frequency response of any section $i$ of equalizer 16 is given by $b_i \cdot B_i(f)$, where $b_i$ is the magnitude of the equalizer control quantity controlling section $i$. Equalizer 16 typically includes permanent memories for storing the values of the N control quantities $b_1$ through $b_N$ generated during the last realignment of the system so that equalizer 16 can be held in the alignment last determined to be appropriate.

Periodically, the transmission characteristic of the system described above can be expected to deviate from the desired characteristic. The system will then require equalization, i.e., adjustment of equalizer 16 to restore the system to the proper alignment. This involves computing quantities $\Delta b_1$ through $\Delta b_N$ by which equalizer control quantities $b_1$ through $b_N$, respectively, must be incremented in order to improve the equalization (i.e., reduce the misalignment) of the system. Once determined, incremental control quantities $\Delta b_1$ through $\Delta b_N$ are algebraically combined with the present control quantities $b_1$ through $b_N$, respectively, to produce new values for quantities $b_1$ through $b_N$. Responsive to these new control quantities, the several sections of equalizer 16 readjust to reduce the misalignment of the system.

Let $E(f)$ represent the misalignment characteristic of the system including cable 14 and equalizer 16. $E(f)$ therefore represents the deviation of the transmission characteristic of the system from the desired level for all frequencies in the transmission band. This misalignment must be corrected by appropriate adjustment of equalizer 16. Since perfect equalization is a practical impossibility, let the residual misalignment characteristic, $S(f)$, be given as follows:

$$S(f) = E(f) - [\Delta b_1 B_1(f) + \Delta b_2 B_2(f) + \ldots + \Delta b_N B_N(f)] \quad (1)$$

where $\Delta b_1$ through $\Delta b_N$ are the amounts by which control quantities $b_1$ through $b_N$, respectively, are to be adjusted. The objective of equalization is to select incremental control quantities $\Delta b_1$ through $\Delta b_N$ such that this residual misalignment is minimized. This is accomplished in accordance with the principles of this invention in a manner analogous to the method of least squares, i.e., by minimizing the square of $S(f)$ integrated over the entire frequency band of the system.

Let $M$ be the integral-square residual misalignment. $M$ is therefore given by the relation $$M = \int_{f_1}^{f_2} \{E(f) - [\Delta b_1 B_1(f) + \Delta b_2 B_2(f) + \ldots + \Delta b_N B_N(f)]\}^2 df \quad (2)$$

where $f_1$ and $f_2$ are the lower and upper limits, respectively, of the transmission band of the system. $M$ is minimized by satisfying the relationship $$(\delta M)/(\delta \Delta b_i) = 0 \quad (3)$$

for $1 \leq i \leq$ N. Substituting relation (2) into relation (3) yields N equations of the form $$\frac{\partial M}{\partial \Delta b_i} = -2 \int_{f_1}^{f_2} \{E(f) - [\Delta b_1 B_1(f) + \Delta b_2 B_2(f) + \ldots + \Delta b_N B_N(f)]\} B_i(f)\, df = 0 \quad (4)$$

or $$\int_{f_1}^{f_2} E(f) B_i(f) df = \Delta b_1 \int_{f_1}^{f_2} B_1(f) B_i(f) df + \Delta b_2 \int_{f_1}^{f_2} B_2(f) B_i(f) df + \ldots + \Delta b_N \int_{f_1}^{f_2} B_N(f) B_i(f) df. \quad (5)$$

To simplify the notation in relation (5), let $$\int_{f_1}^{f_2} E(f) B_i(f) = E_i \quad (6)$$

and let $$\int_{f_1}^{f_2} B_i(f) B_j(f) = B_i B_j \quad (7)$$

The N simultaneous equations exemplified by (5) can then be written in matrix form as follows:

$$\begin{bmatrix} E_1 \\ E_2 \\ \cdot \\ \cdot \\ \cdot \\ E_N \end{bmatrix} = \begin{bmatrix} B_1B_1 & B_1B_2 & \ldots & B_1B_N \\ B_1B_2 & B_2B_2 & \ldots & B_2B_N \\ \cdot & \cdot & & \cdot \\ \cdot & \cdot & & \cdot \\ \cdot & \cdot & & \cdot \\ B_1B_N & B_2B_N & \ldots & B_NB_N \end{bmatrix} \begin{bmatrix} \Delta b_1 \\ \Delta b_2 \\ \cdot \\ \cdot \\ \cdot \\ \Delta b_N \end{bmatrix} \quad (8)$$

or, simplifying the notation still further, as:

$$[E] = [B]\ [\Delta b] \quad (9)$$

Solving relation (9) for the incremental equalizer control quantities yields $$[\Delta b] = [B]^{-1}[E] \quad (10)$$

Given a particular equalizer, matrix $B$ in equation (10) can be calculated from the normalized frequency response functions of the equalizer sections in accordance with relation (7). FIG. 1 then shows apparatus for determining vector E and calculating vector $\Delta b$ in order to realign the system in accordance with the principles of this invention.

More particularly, when a readjustment of equalizer 16 is to be made, cable 14 and equalizer 16 are taken out of service, for example, by disconnecting the transmission line at terminals 10 and 18. Misalignment function $E(f)$ is then determined by applying a test sweep signal to the input terminal of cable 14 and comparing the output signal level with the desired output signal level for all frequencies in the transmission band. The required sweep signal is a signal having a predetermined constant amplitude with frequency varying monotonically from $f_1$ to $f_2$. This sweep signal is generated by sweep generator 12 which may be any suitable signal generator. Detector 20 compares the output signal level to the desired output signal level supplied by reference source 22 to produce an output signal proportional to $E(f)$.

In order to compute vector $E$, signal $E(f)$ must be weighted (i.e., multiplied) by each of normalized frequency response functions $B_1(f)$ through $B_N(f)$ and each product integrated over the entire transmission band (see relation (6)). These several multiplications and integrations can, of course, be performed simultaneously. Considerably less apparatus is required, however, if they are performed one at a time, each result being stored until all results are available. This is done in the apparatus of FIG. 1 by arranging sweep generator 12 to produce N successive sweep signals. Similarly, coefficient memory 32, which stores signal information representative of normalized frequency response functions $B_1(f)$ through $B_N(f)$, is arranged to apply signal information regarding those functions sequentially, i.e., one function during each sweep. Memory 32 is further synchronized with sweep generator 12 so that $E(f)$ and $B_i(f)$ for the same values of $f$ are applied to multiplier 30 at the same time. Multiplier 30 therefore performs a continuous multiplication of $E(f)$ for all values of $f$. Memory 32 is thus synchronized with sweep generator 12 by timing circuit 24 which may include apparatus for detecting the start and finish of a sweep signal and for controlling memory 32 accordingly. Suitable timing circuitry is shown, for example, in U. S. Pat. No. 3,573,667 issued to C. Kao et al. on Apr. 6, 1971 and in U. S. Pat. No. 3,633,129 issued on Jan. 4, 1972 to C. Kao et al.

Integrator 40 is also arranged to perform N successive integrations from $f_1$ to $f_2$, each beginning when a sweep begins and ending when the sweep is completed. Integrator 40 is therefore also conveniently controlled by timing circuit 24. The result of each integration, $E_i$ (where $i$ depends on which weighting function $B_i(f)$ was applied to multiplier 30 during the integration), is stored in memory 50.

When N sweep signals have been generated and processed as described above, the N quantities $E_1$ through $E_N$ which make up vector $E$ are applied to processor 60 for multiplication by the inverse of matrix B in accordance with relation (10). Since the normalized frequency response functions of the several sections of equalizer 16 are known, matix B can be predetermined and its inverse stored in processor 60. Processor 60 may be either analog or digital apparatus capable of matrix multiplication. Suitable analog circuitry (i.e., a resistive network) is shown in the above-mentioned article by Ketchledge et al. Any of a wide variety of general purpose digital computing machines can be used to perform the required processing digitally. Suitable programming techniques are discussed, for example, in *Introduction to Numerical Methods and FORTRAN Programming* by T. R. McCalla (John Wiley & Sons, Inc., 1967).

The equalizer control quantities thus determined by processor 60 (i.e., $\Delta b_1$ through $\Delta b_N$) are applied to equalizer 16 for addition to control quantities $b_1$ through $b_N$ stored in the permanent memories which are part of the equalizer apparatus. The memories of equalizer 16 are therefore conveniently realized as accumulators for adding the incremental control quantities produced by processor 28 to the control quantities already in storage. Responsive to the altered values of control quantities $b_1$ through $b_N$, the several sections of equalizer 16 adjust to improve the alignment of the transmission system. The realignment process can be repeated (if necessary) once equalizer 16 has settled into its new alignment.

In the event that stability of the equalizer control system is a problem, processor 60 may also be arranged to multiply the inverse of matrix B and vector E by a predetermined diagonal grain matrix G, i.e., an N by N matrix with suitable gain control quantities on the main diagonal and zeros elsewhere. These gain control quantities are conveniently chosen mathematically less than one to prevent the control system from attempting a one-step adjustment of equalizer 16, thereby insuring the stability of the control system. The use of gain control means, of course, that several repetitions of the realignment process described above will be required to achieve optimum equalization.

The equalizer control apparatus shown in FIG. 1 can be considerably simplified by taking a somewhat different approach to the calculation of the quantities in vector E in relation (10). In particular, instead of computing the N weighted misalignment integrals directly as is done by devices 30, 32, and 40, in the apparatus of FIG. 1, these quantities can be determined indirectly by determining the gradient of $M$ using a method of finite differences. This approach makes it unnecessary to store the normalized response functions of the equalizer sections for use as weighting functions. Accordingly, coefficient memory 32 and multiplier 30 can be eliminated. Apparatus suitable for controlling an equalizer in accordance with this alternative approach is shown in FIG. 2.

Figure 2:
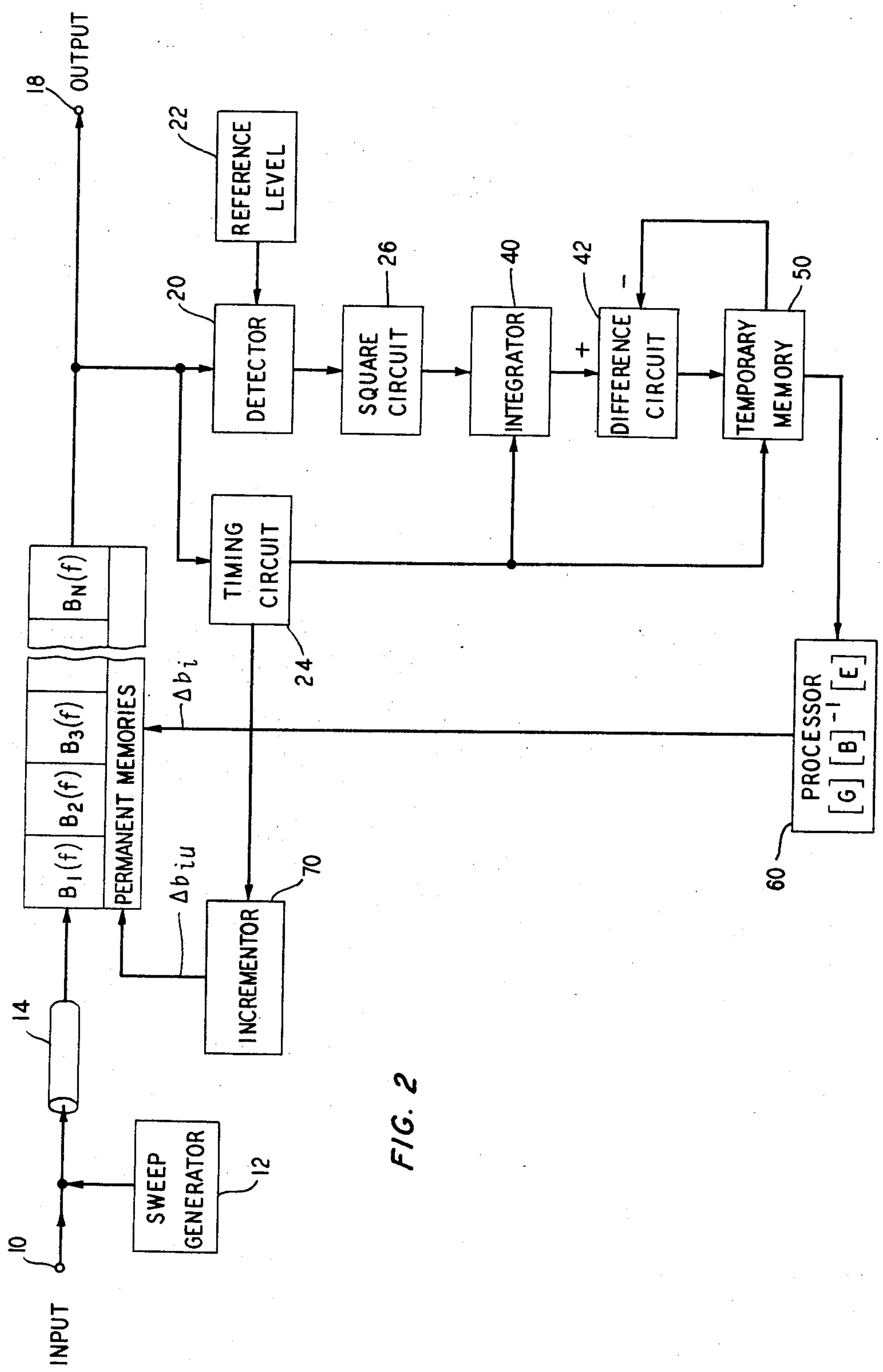
FIG. 2 is a block diagram of an alternative embodiment of the adjustable equalizer control apparatus of this invention.

The actual transmission apparatus shown in FIG. 2 is identical to that shown in FIG. 1. Thus the equalizer per se is the same in both systems. Assume that the transmission system of FIG. 2 has been determined to be in need of realignment. Let the settings of equalizer control quantities $b_1$ through $b_N$ be designated $b_{10}$ through $b_{NO}$, where the subscript O is used to indicate an initial condition. The misalignment of the system is then given by the relation $$E(f) = E(f) - [b_{10}B_1(f) + b_{20}B_2(f) + \ldots + b_{NO}B_N(f)] \quad (11)$$

where $E(f)$ is the misalignment of the system with all equalizer control quantities mathematically zero. $E(f)$ is needed only in the mathematical analysis and does not have to be determined in the actual system.

Again we are attempting to minimize the integral-square error $M$. The initial integral-square error, $M_O$, is given by the relation $$M_0 = \int_{f_1}^{f_2} E^2(f)\,df. \quad (12)$$

Also $$\frac{\partial M_0}{\partial b_{i0}} = \frac{\partial}{\partial b_{i0}} \int_{f_1}^{f_2} E^2(f)\,df$$

$$= 2\int_{f_1}^{f_2} \{\tilde{E}(f) - [b_{10}B_1(f) + b_{20}B_2(f) + \ldots + b_{NO}B_N(f)]\}[-B_i(f)]df$$

$$= -2\int_{f_1}^{f_2} E(f)B_i(f)\,df \quad (13)$$

For small increments in $b_i$, however, $$\frac{\partial M_0}{\partial b_{i0}} \approx \frac{\Delta M_0}{\Delta b_{iu}} = \frac{M_0(b_{i0}+\Delta b_{iu}) - M_0}{\Delta b_{iu}} \quad (14)$$

where $\Delta b_{iu}$ is the predetermined unit or test increment in $b_i$ (to be distinguished from the computed readjustment increment $\Delta b_i$) and $M_O(b_{iO}+\Delta b_{iu})$ is the value of $M$ after $b_{iO}$ has been incremented by $\Delta b_{iu}$. Combining relations (13) and (14) yields $$-2\int_{f_1}^{f_2} E(f)B_i(f)\,df = \frac{M_0(b_{i0}+\Delta b_{iu}) - M_0}{\Delta b_{iu}} \quad (15)$$

or $$\int_{f_1}^{f_2} E(f)B_i(f)\,df = -\frac{M_0(b_{i0}+\Delta b_{iu}) - M_0}{2\Delta b_{iu}}. \quad (16)$$

The weighted misalignment integrals which make up vector $E$ in equation (10) can therefore be determined by performing the computation indicated by the right-hand side of relation (16), i.e., by computing an initial integral-square misalignment $M_O$, computing integral-square misalignments after small test increments in each of the equalizer control quantities, and dividing the difference between the initial and the incremented integral-square misalignment for each control quantity by twice the control quantity test increment. Once vector $E$ has been determined in this manner, incremental control quantities $\Delta b_1$ through $\Delta b_N$ can be computed by application of equation (10).

Referring now to FIG. 2, when realignment of the transmission system is required, the system is taken out of service in the same manner as the system of FIG. 1. Sweep generator 12 then generates a sweep signal of the type generated by the sweep generator of FIG. 1. Detector 20 produces an output signal proportional to $E(f)$. Square circuit 26 squares this signal and integrator 40 integrates the squared signal for all frequencies in the sweep to produce an output quantity representative of initial integral-square misalignment $M_O$. Like the apparatus of FIG. 1, integrator 40 in FIG. 2 is conveniently under the control of timing circuit 24 which signals the start and finish of a sweep signal. Temporary memory 50, which may be cleared at any time prior to realignment, applies zero to one input terminal of difference circuit 42 as integrator 40 applies quantity $M_O$ to the other input terminal. Difference circuit 42 therefore applies $M_O$ to memory 50 unaltered. Memory 50 stores $M_O$ for application to difference circuit 42 during each of N subsequent sweeps.

When $M_O$ has been computed as described above, N further sweep signals are successively generated by sweep generator 12. Before each of these sweep signals begins, incrementor 70 increments one of the N equalizer control quantities stored in the memory of equalizer 16 by an amount $\Delta b_{iu}$, where $i$ is the index of the incremented control quantity. For this purpose incrementor 70 is conveniently under the control of timing circuit 24. When the subsequent sweep signal begins, devices 20, 22, 26, and 40 operate in the manner described above to produce an output quantity representative of integral-square misalignment $M_O(b_{iO}+\Delta b_{iu})$. Difference circuit 42 computes the difference between each $M_O(b_{iO}+\Delta b_{iu})$ and $M_O$ and memory 50 stores the result. After each such difference has been computed and stored, incrementor 70 restores the incremented control quantity to its initial value.

When all N control quantities have been incremented in turn and N quantities equal to the difference between $M_O(b_{iO}+\Delta b_{iu})$ and $M_O$ are stored in memory 50, vector $E$ can be computed by dividing each of these difference quantities by $-2\Delta b_{iu}$. Since vector $E$ is to be immediately processed by processor 60, the required scaling of the quantities in memory 50 is readily performed in processor 60. The resulting vector $E$ is then multiplied by matrix B inverse (and by matrix G, if desired) in a manner entirely similar to that discussed above in connection with FIG. 1 to produce N control quantities for application to equalizer 16. Again, the foregoing procedure can be repeated as many times as necessary to achieve the desired degree of equalization.

It is to be understood that the embodiments shown and described herein are illustrative of the principles of this invention only and that modifications may be implemented by those skilled in the art without departing from the scope and spirit of the invention. For example, any of the required control signal processing may be accomplished by either analog or digital means as discussed above.

What is claimed is:

1. Apparatus for controlling the frequency response levels of the several sections of an adjustable equalizer, said equalizer serving to equalize transmission line apparatus in a transmission system, comprising:

means for applying a test sweep signal of a predetermined amplitude to said transmission line, said test sweep signal having monotonically varying frequency;

detector means responsive to the output signal of said equalizer for comparing the amplitude of said test sweep signal as transmitted by said transmission system to a predetermined reference amplitude level to develop an output signal representative of the misalignment of said transmission system for all frequencies in said test sweep signal; and means responsive to the output signal of said detector for adjusting the frequency responses of said equalizer sections to levels which reduce the square of said misalignment signal integrated over all frequencies in said test sweep signal.

2. Apparatus for controlling the several sections of an adjustable equalizer, each of said sections having a normalized frequency response function the amplitude of which is controlled by an equalizer control signal, said equalizer serving to equalize transmission line apparatus in a transmission system, comprising:

means for applying a test sweep signal of a predetermined amplitude to said transmission line, said test sweep signal having monotonically varying frequency;

detector means responsive to the output signal of said equalizer for comparing the amplitude of said test sweep signal as transmitted by said transmission system to a predetermined reference amplitude level to develop a signal proportional to the misalignment of said transmission system for all frequencies in said test sweep signal; and means responsive to said misalignment signal for developing equalizer control signals for adjusting the amplitude of each of said frequency responses to levels which reduce the square of said misalignment signal integrated over all frequencies in said test sweep signal.

3. The apparatus defined in claim 2 wherein said means responsive to said misalignment signal comprises:

means for determining a vector of products of said misalignment signal and the normalized frequency response of each of said equalizer sections integrated over all frequencies in said test sweep signal; and means for multiplying said vector of products by the inverse of a matrix of all pairwise products of the normalized frequency responses of said equalizer sections integrated over all frequencies in said test sweep signal to produce a vector of said equalizer control signals.

4. The apparatus defined in claim 3 wherein said means for determining comprises:

means for multiplying said misalignment signal by the normalized frequency response function for each of said equalizer sections at all frequencies in said test sweep signal to produce a plurality of weighted misalignment signals; and means for integrating each of said weighted misalignment signals over all frequencies in said test sweep signal to produce said vector of products.

5. The apparatus defined in claim 3 wherein said means for determining comprises:

means for determining an initial integral-square misalignment representative of the square of said misalignment signal integrated over all frequencies in said test sweep signal;

means for incrementing each of said equalizer control quantities in turn;

means for determining a plurality of differential integral-square misalignments each representative of the difference between said initial integral-square misalignment and an integral-square misalignment representative of the square of said misalignment signal after the incrementing of an equalizer control quantity integrated over all frequencies in said sweep signal; and means for dividing each of said differential integral-square misalignments by a quantity proportional to the increment in the corresponding equalizer control quantity to produce said vector of products.

6. The method of equalizing a transmission system including an adjustable equalizer having a plurality of adjustable equalizer sections, each having a frequency response level controlled by an equalizer control quantity, comprising the steps of:

applying a test sweep signal to said transmission system, said test sweep signal having monotonically varying frequency;

comparing the amplitude of said test sweep signal as transmitted by said transmission system to a predetermined reference level to develop a signal representative of the misalignment of said system at all frequencies in said test sweep signal; and processing said misalignment signal to produce equalizer control quantities for adjusting the frequency response levels of each of said equalizer sections to reduce the square of said misalignment signal integrated over all frequencies in said test sweep signal.

7. The method of equalizing a transmission system including an adjustable equalizer having a plurality of independently adjustable equalizer sections, each having a frequency response level controlled by an equalizer control quantity and characterized by a predetermined normalized frequency response function, comprising the steps of:

applying a test sweep signal to said transmission system, said test sweep signal having monotonically varying frequency;

comparing the amplitude of said test sweep signal as transmitted by said transmission system to a predetermined reference level to develop a signal representative of the misalignment of said system at all frequencies in said test sweep signal;

multiplying said misalignment signal at all frequencies in said test sweep signal by the normalized frequency response function of each of said equalizer sections at the corresponding frequency to produce a plurality of weighted misalignment signals;

integrating each of said weighted misalignment signals over all frequencies in said test sweep signal to produce a vector of integrated weighted misalignment quantities; and multiplying said vector of integrated weighted misalignment quantities by a predetermined matrix of said normalized frequency response functions integrated over all frequencies in said test sweep signal to produce a plurality of equalizer control quantities for reducing the square of said misalignment signal integrated over all frequencies in said test sweep signal.

8. The method of equalizing a transmission system including an adjustable equalizer having a plurality of adjustable equalizer sections, each having a frequency response level controlled by an equalizer control quantity and characterized by a predetermined normalized frequency response function, comprising the steps of:

applying a test sweep signal to said transmission system, said test sweep signal having monotonically varying frequency;

comparing the amplitude of said test sweep signal as transmitted by said transmission system to a predetermined reference level to develop a signal representative of the misalignment of said system at all frequencies in said test sweep signal;

squaring said misalignment signal for all frequencies in said test sweep signal;

integrating said squared misalignment signal overall frequencies in said test sweep signal to produce an initial integral-square misalignment quantity;

incrementing each of said equalizer control quantities in turn;

repeating the first through fourth of the above steps for each incremented control quantity to produce a vector of incremented integral-square misalignment quantities;

subtracting said initial integral-square misalignment quantity from each of said incremented integral square misalignment quantities to produce a vector of differential integral-square misalignment quantities; and multiplying said vector of differential integral-square misalignment quantities by a predetermined matrix of said normalized frequency response functions integrated over all frequencies in said test sweep signal to produce equalizer control quantities for reducing the integral-square misalignment of said transmission system.

* * * * *